Patented Feb. 2, 1926.

1,571,455

UNITED STATES PATENT OFFICE.

ARNOLD MOETTELI, OF OBERWINTERTHUR, SWITZERLAND.

PLANT FOR COOLING HOT COKE AND UTILIZING THE HEAT LIBERATED THEREBY.

Application filed January 19, 1922. Serial No. 530,487.

*To all whom it may concern:*

Be it known that I, ARNOLD MOETTELI, a citizen of Switzerland, residing at and whose post-office address is Oberwinterthur, Romerstrasse 21, Switzerland, have invented certain new and useful Improvements in Plants for Cooling Hot Coke and Utilizing the Heat Liberated Thereby, of which the following is a specification.

The invention relates to a plant for dry cooling of coke by means of cooling gases conducted in a closed circuit through the coke and over a heat exchanging device. It is based on the fact that the plant consists of at least two coke cooling chambers and of at least two heat exchanging devices that are connected with each other by means of cool gas conduits that can be closed, that each cooling chamber, instead of being inseparably connected with only one heat exchanging device can be selectively connected with at least two heat exchanging devices, or that each heat exchanging device can be selectively connected with at least two coke cooling chambers, in order not to be obliged to suspend the operations of the heat exchanging device when the operation of a coke cooling chamber is suspended, or to suspend the operation of the coke cooling chamber when the operation of a heat exchanging device is suspended.

One form of the invention is illustrated in the drawings, in which

*a* is a coke oven battery in which the hot coke is formed, *b* a coke cooling plant consisting of the coke cooling chambers *c*, and the boilers *e* in which cooling plant the coke is cooled in a well known manner by means of an inert gaseous medium, the medium being circulated by means of the blowers *h* through the conduits *r* in a circular path through the mass of coke in the coke chambers and through the chambers of the boilers.

The hot coke is introduced into the cooling chambers by means of the portable receptacles *f* in a familiar way through the funnels *p*. When the discharge devices *h* are opened, the coke, owing to its gravity, will be discharged from the cooling chamber. It is then received by railroad cars *l* waiting for it on which it is carried to its destination.

Figure 1:
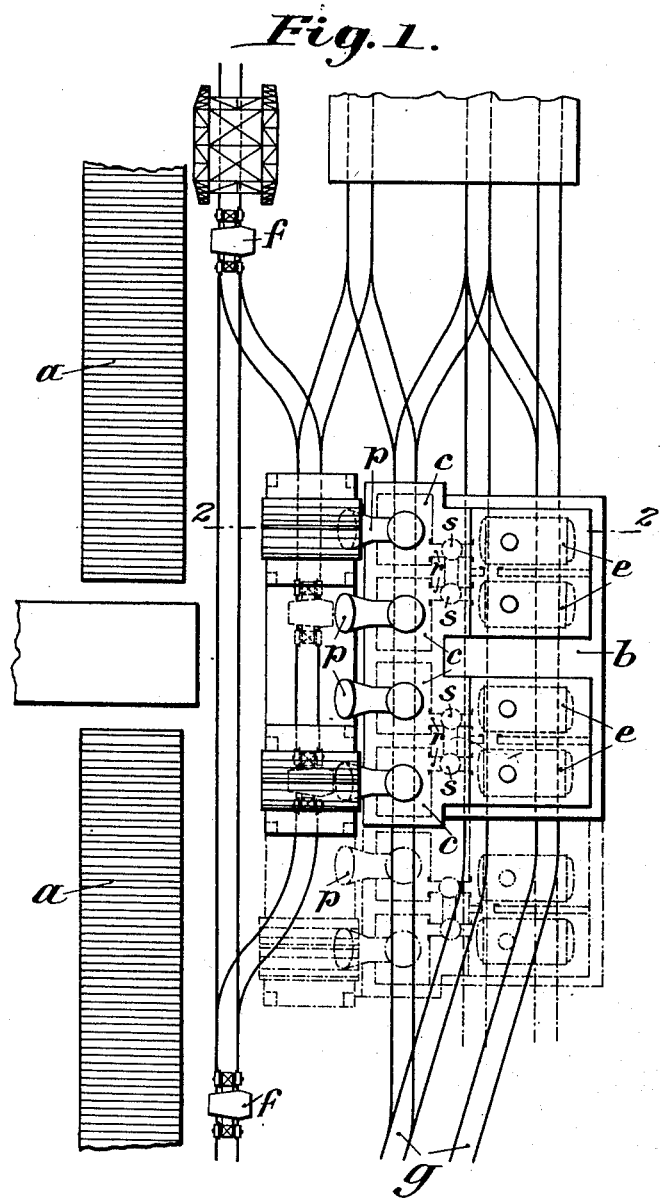
Fig. 1 is a plan view of a plant embodying the invention.
Figure 2:
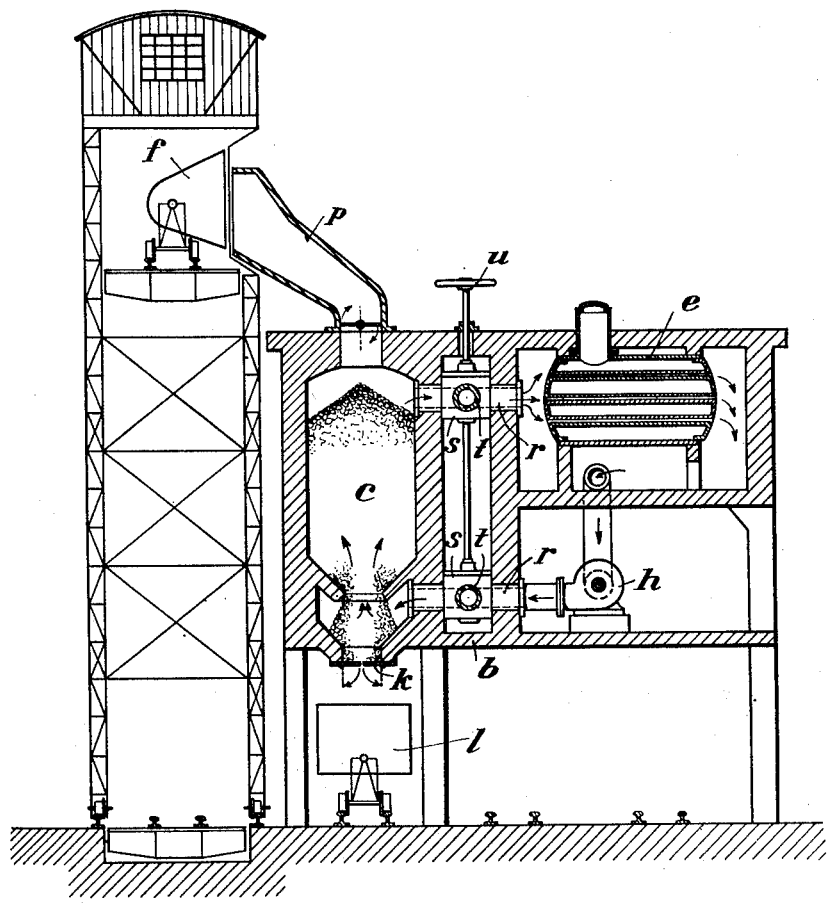
Fig. 2 is a section on the line 2—2 of Fig. 1, drawn on an enlarged scale.
Figure 3:
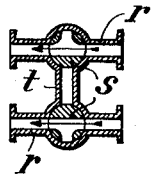
Figs. 3 to 9 are detail sectional views of the switching devices shown in different positions.
Figure 4:
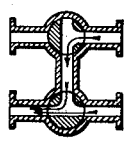
Figure 5:
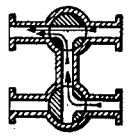
Figure 6:
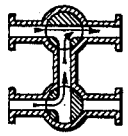
Figure 7:
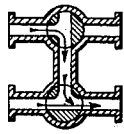
Figure 8:
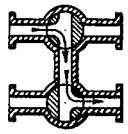
Figure 9:
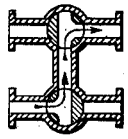

The cooling gas conduits *r* are provided with reversing devices *s* and connecting conduits *t* that can be shut off. In this manner it is made possible to connect, for example, in the event of a suspension of the operation of one of the cooling chambers or of a boiler, the boiler or the cooling chamber originally cooperating with the same, with another cooling chamber or boiler, instead of disconnecting them also. In the position of the reversing devices *s* shown in Fig. 3, each of two cooling chambers is connected with the opposite boiler. In the position shown in Fig. 4, the upper cooling chamber and in Fig. 5 the lower cooling chamber is disconnected. At the same time both boilers are connected with the cooling chamber which is still in operation. In Figs. 6 and 7 positions are shown in which both cooling chambers are working with the upper, and lower boilers respectively. In Fig. 8, the upper cooling chamber is working in conjunction with the lower boiler, whereas the lower cooling chamber and the upper boiler are disconnected. Fig. 9 represents the position in which the lower cooling chamber is connected with the upper boiler, whereas the upper cooling chamber and the lower boiler are disconnected. The reversing is done by revolving the device *s* which are three-way valves by means of the hand wheels *u*.

I claim:

1. A plant for dry cooling hot coke comprising at least two coke cooling chambers, at least two heat exchanging devices, means for circulating cooling gases in a closed circuit through each cooling chamber and the corresponding heat exchanging device, and means whereby each cooling chamber may be selectively connected with any or all of at least two heat exchanging devices and each heat exchanging device may be selectively connected with at least two cooling chambers, said means maintaining a closed circuit between the interconnected cooling chambers and heat exchanging devices.

2. A plant for dry cooling hot coke comprising at least two coke cooling chambers, at least two heat exchanging devices, means for circulating cooling gases in a closed circuit through each cooling chamber and the corresponding heat exchanging device, and means whereby each cooling chamber may be connected with at least one non-corresponding heat exchanging device and each heat exchanging device may be connected with at least one non-corresponding cooling chamber, said means maintaining a closed circuit between the interconnected cooling chambers and heat exchanging devices.

In testimony whereof I have affixed my signature.

ARNOLD MOETTELI.